United States Patent [19]
Kodaka et al.

[11] Patent Number: 5,346,654
[45] Date of Patent: Sep. 13, 1994

[54] MEHOD OF FORMING INDICIA ON COMPACT DISKS AND INDICIA-BEARING COMPACT DISKS

[75] Inventors: Ichiro Kodaka, Closter, N.J.; Shoji Ishida; Charles Plumer, both of Richmond, both of Ind.

[73] Assignee: Sanyo Laser Products, Inc., Richmond, Ind.

[21] Appl. No.: 923,033

[22] Filed: Jul. 31, 1992

[51] Int. Cl.⁵ .............................................. G11B 7/00
[52] U.S. Cl. .................... 264/1.33; 264/2.5; 264/107
[58] Field of Search ............... 264/106, 107, 219, 227, 264/2.5, 22, 1.3; 369/274, 272, 292

[56] References Cited
U.S. PATENT DOCUMENTS
5,099,469 3/1992 Dobbin et al. ............... 264/1.1

Primary Examiner—Paul M. Dzierzynski
Assistant Examiner—Don Wong
Attorney, Agent, or Firm—Willian Brinks Hofer Gilson & Lione

[57] ABSTRACT

A new compact disk ("CD") is formed providing a bright, metallic presentation of indicia such as trademarks, promotion and advertising copy and other alphanumeric information around the circumference of the disk with recorded digital data in the disk's central portion. Such a CD may be a 120 mm CD including a central portion recorded in the 80 mm format of a single CD, with the desired indicia formed by a bright metal indicia-bearing substrate in the 20 mm, radially-extending, circumferential portion of the CD that surrounds the recorded digital data.

Such CD's are manufactured by recording the digital data in the central 80 mm of a 120 mm master, leaving the remaining unrecorded circumferential portion of the master with a smooth surface and applying the desired indicia onto the unrecorded outer peripheral portion of a disk used to form production stampers.

11 Claims, 3 Drawing Sheets

PRIOR ART

MEHOD OF FORMING INDICIA ON COMPACT DISKS AND INDICIA-BEARING COMPACT DISKS

FIELD OF THE INVENTION

This invention relates to the production of plastic articles and optical storage devices such as compact disks and, more particularly, relates to the formation of indicia on compact disks and to novel indicia-bearing compact disks.

BACKGROUND OF THE INVENTION

Compact disks (CDs) are formed by an optically transparent plastic, such as a polycarbonate, like General Electric's Lexan, which is an easily molded plastic material capable of transmitting a light beam, such as a thin laser beam, without scattering, refracting or distorting the light beam. CDs are generally manufactured in a 120 mm format, although an 80 mm "single" format is available. With such 120 mm CDs, approximately 74 minutes of a digital signal, which is generally either music or an audio presentation, may be stored in the outer circumferential portion of one side of the disk having a radial extent of approximately 58.5 mm. In the production of such CDs, the trademarks and alphanumeric information identifying the disk content are normally silk-screened onto the side of the CD opposite the side to be read by the laser of the CD player.

The manufacture of CDs begins with a glass plate which has one surface highly polished to provide a smooth flat surface which is cleaned to be free of dirt. A photoresistive material is applied to the polished and clean surface of the glass plate to form a uniform thin film with a constant thickness which can only vary about ±50 angstroms. After the photoresistive coating on the surface of the glass plate has been cured and inspected, the digital data representing music or visual images is formed in the photoresistive coating by modulation of a high energy laser beam. The photoresistive material is then developed in the pattern of the digital data and the photoresistive material forming the pattern of the digital data is removed from the glass plate, leaving a photoresistive coating on the surface of the glass including a pattern of "pits" which represent the digital data and the music or audio information. A silver coating is formed over the photoresistive coating with its pattern of pits representing the digital data, preferably by sputtering, to provide a "master" for use in the formation of CDs. The master is then electroplated with nickel at a variable plating rate to provide a mating form for molds to replicate the digital data by injection molding. This mating form is referred to as a "stamper", and/or the "master stamper" and/or the "father stamper".

Rather than use this form in production tooling, the father stamper is replicated to provide the production molds actually used in the production of CDs. In a manner known in the art, the nickel stamper is oxidized using an oxidizing agent. After oxidation, the oxidized nickel stamper is washed with water and isopropyl alcohol and is placed into a plating bath to be plated with nickel to build a negative image in the form of the original master, referred to as a "mother" disk. The nickel mother disk is stripped from its father stamper and oxidized with an oxidizing agent and washed with water and isopropyl alcohol. The resulting mother is used to form production stampers for use in injection molding of the CDs by the same process described above in the production of the father stamper from the master.

The production stampers provide a mold surface to form the digital signal pits in the polycarbonate CDs formed by injection molding. That is, polycarbonate plastic material is injection molded against the production stampers and, when removed from the injection molding machine, provides a CD substrate including on one surface pits in the pattern of the digital data representing the recorded music or audio information. The surface of the polycarbonate CD with the recorded information is then coated with a reflective aluminum coating by sputtering and after inspection, the aluminum-coated recorded surface on the recorded side of the CD is protected by a coating of lacquer, or other such protective coating.

After the lacquer coating is cured, desired indicia are silk-screened onto the lacquer coating in a manner well known in the art. Such indicia frequently include the trademarks of the record company, the name of the performer, the names of the recorded songs, the number and running time of the various tracks and other such information.

In reproducing the recorded information on the CD, the CD player directs a laser beam through the polycarbonate material forming the uncoated side of the disk and senses the variations in reflection of the laser beam from the pits and the reflective aluminum coating to reproduce the recorded music and audio information and the like.

SUMMARY OF THE INVENTION

In the invention, a novel CD is formed providing a bright, metallic presentation of indicia such as trademarks, promotion and advertising copy and other alphanumeric information around the circumference of the disk with recorded digital data in the disk's central portion. It should be understood that in the remainder of the description of this invention, we will refer to "desired indicia" which will mean any readable indicia, such as pictures and other images, trademarks, symbols, words and numbers.

Preferably, a CD of the invention may be a 120 mm CD including a central portion recorded in the 80 mm format of a single CD with the desired indicia formed by a bright metal indicia-bearing substrate in the 20 mm, radially-extending, circumferential portion of the CD that surrounds the recorded digital data.

In the preferred method of the invention, such CDs are manufactured by recording the digital data in the central 80 mm of a 120 mm master, leaving the remaining unrecorded circumferential portion of the master with a smooth surface. A father stamper is formed as described above including an unrecorded peripheral portion. A mother to be used in producing production stampers is then produced by electroforming the mother on the father stamper, as set forth above, including an unrecorded peripheral portion. After stripping the nickel mother from the father stamper, desired indicia is silk-screened onto the unrecorded outer peripheral portion of the mother with silver ink of high purity. After the silver ink has cured on the periphery of the mother disk in the pattern of the desired indicia, the nickel on the mother disk is oxidized with an oxidizing agent, as set forth above, washed only with water and placed while water-wet in the nickel electroforming bath where a nickel production stamper is formed, including a central portion with the recorded digital data and a 20 mm wide peripheral portion adapted to form the desired indicia.

Such production stampers are used to form, by injection molding, CDs including a central portion with pits in the pattern of the recorded digital data and an outer peripheral portion with the surface adapted to present the desired indicia in a bright reflective metal when the injection-molded CD is provided with its reflective aluminum coating through sputtering.

Thus, the invention provides a novel CD particularly adapted for promotional use or for a new CD-single with digitally recorded music, audio or visual information in the central portion of the disk, and a bright, eye-catching presentation of desired indicia in a large area surrounding the recorded digital information. Furthermore, the invention can supplement information which may be silk-screened onto the lacquer side of the disk and, in some cases, may entirely eliminate the silk-screening operation.

DETAILED DESCRIPTION OF A PREFERRED EMBODIMENT

Figure 1A:
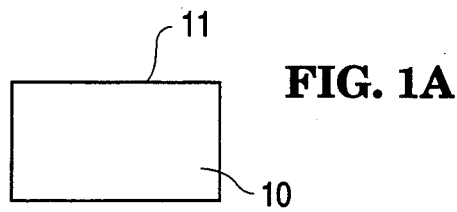
FIGS. 1A–M are process diagrams showing the prior art steps in the manufacture of CDs.
Figure 1B:
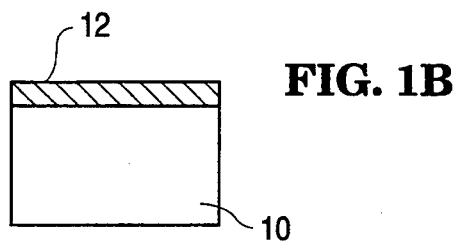
Figure 1C:
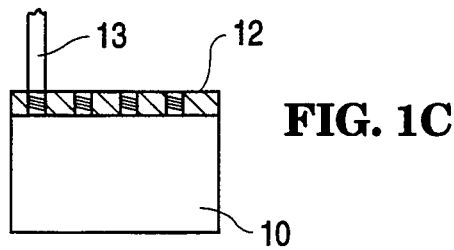
Figure 1D:
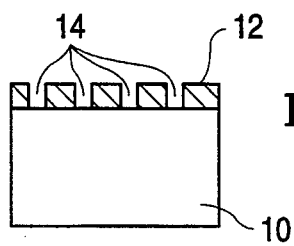
Figure 1E:
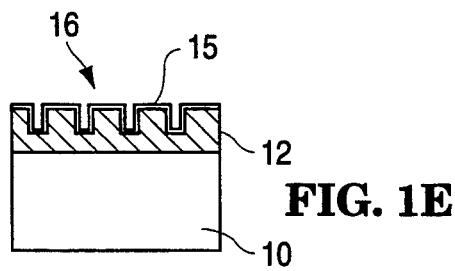
Figure 1F:
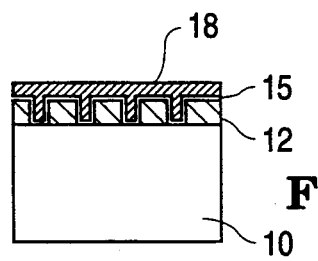
Figure 1G:
Figure 1H:
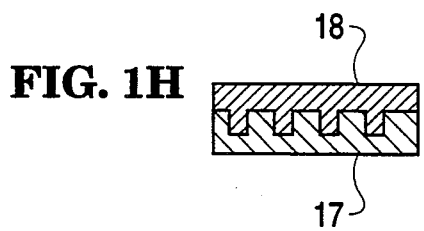
Figure 1I:
Figure 1J:
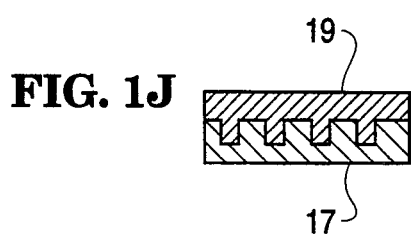
Figure 1K:
Figure 1L:
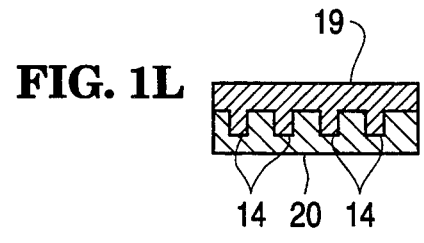
Figure 1M:
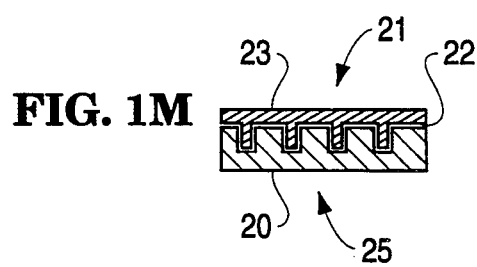

FIG. 1 is a process diagram to illustrate the steps taken to produce a CD. It should be understood that FIG. 1 is diagrammatic and is not intended to depict actual structures or scales. FIG. 1 shows a series of cross-sections of elements used in the production of a CD. Element sizes and thicknesses and pit size are all substantially enlarged and out of scale in order to help indicate the manufacturing process, which is well known in the art.

As indicated at A of FIG. 1, the manufacture of CDs begins with a glass plate 10 which has one surface 11 highly polished to provide a smooth flat surface which is cleaned to be free of dirt. As indicated at B of FIG. 1, a photoresistive material 12 is applied to the polished and clean surface 11 of the glass plate 10 to form a uniform thin film with a constant thickness which can only vary about ±50 angstroms. After the photoresistive coating on the surface of the glass plate has been cured and inspected, the glass plate is rotated and the digital data representing music or other digital information is formed in the photoresistive coating by modulation of a high energy laser beam 13, as indicated at C of FIG. 1. The photoresistive material is then developed in the pattern of the digital data, and the photoresistive material forming the pattern of the digital data is removed from the glass plate, as indicated at D of FIG. 1, leaving a photoresistive coating on the surface of the glass including a pattern of "pits" 14 which represent the digital data and the music or audio information. As indicated at E of FIG. 1, a silver coating 15 is formed over the photoresistive coating 12 with its pattern of pits 14 representing the digital data, preferably by sputtering to provide a "master" 16 for use in the formation of CDs.

The master is then electroplated with nickel, as indicated at F of FIG. 1, at a variable plating rate to provide a mating form for molds to replicate the digital data by injection molding. This mating form 18 is referred to as a "stamper" and/or a "master stamper" or "father stamper".

Rather than use this form in production tooling, the stamper 18 is replicated, as indicated at G-K of FIG. 1, to provide the production molds actually used in the production of CDs. In a manner known in the art, the stamper 18 is oxidized using an oxidizing agent. After oxidization, the oxidized stamper 18 is washed with water and isopropyl alcohol. As indicated at H of FIG. 1, stamper 18 is placed into a plating bath to be plated with nickel to build a negative image in the form of the original master, referred to as a "mother" disk 17. The nickel mother disk 17 is stripped from its father stamper 18, as indicated at I of FIG. 1, and oxidized with an oxidizing agent and washed with water and isopropyl alcohol.

The resulting mother 17 is used to form production stampers for use in injection molding of the CDs by the process described above to produce the father stamper 18 from the master 16. That is, the mother 17 is electroplated with nickel, as indicated at J of FIG. 1, to provide a production stamper 19, which is used to mold the CDs.

The production stampers 19 provide a mold surface to form pits 14 in a polycarbonate CD 20 formed by injection molding. As indicated at L of FIG. 1, polycarbonate plastic material is injection-molded against the production stampers 19 and, when removed from the injection molding machine, provide a CD substrate 20, including in one surface, pits 14 in the pattern of the digital data representing the recorded music or digital information. As indicated at M of FIG. 1, the recorded surface 21 of the polycarbonate CD substrate 20 is then coated with a reflective aluminum coating 22 by sputtering and after inspection, the aluminum-coated recorded surface on said one side 21 of the CD is protected by a coating of lacquer 23 or other such protective coating.

After the lacquer coating is cured, desired indicia may be silk-screened onto the lacquer coating in a manner well known in the art. Such indicia frequently include the trademarks of the record company, the name of the performer, the names of the recorded songs, the number and running time of the various tracks and other such information.

In reproducing the recorded information on the CD, the CD player directs a laser beam through the polycarbonate forming the uncoated side 25 of the disk and senses the variations in reflection of the laser beam from the pits 14 and the reflective aluminum coating to reproduce the recorded music and audio information and the like.

In the invention, a novel CD is formed providing a bright, metallic presentation of desired indicia, such as trademarks, promotion and advertising copy and other alphanumeric information around the circumference of the disk with recorded digital data in the disk's central portion. It should be understood that in the remainder of the description of this invention, we will refer to desired indicia which will mean any readable indicia, such as pictures and other images, trademarks, symbols, words and numbers.

Figure 2:
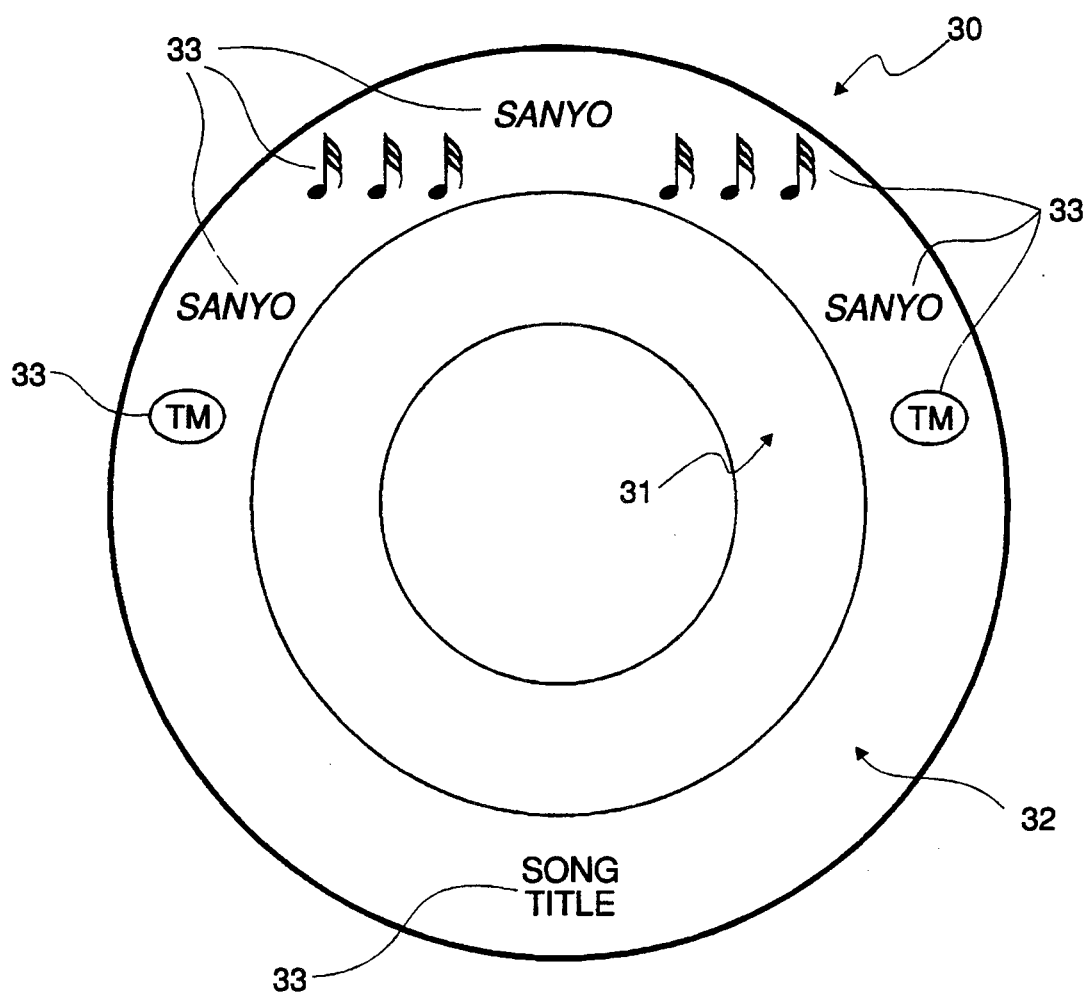
FIG. 2 is a plan view of a novel CD formed with the invention.
Figure 3A:
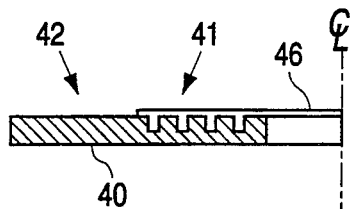
FIGS. 3A–J are process diagrams showing the steps used in the invention.
Figure 3B:
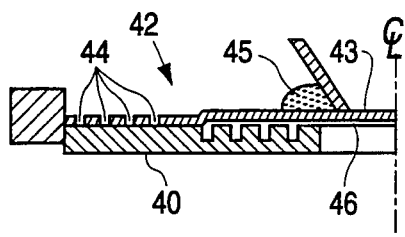
Figure 3C:
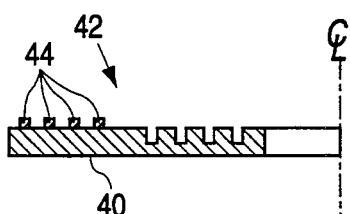
Figure 3D:
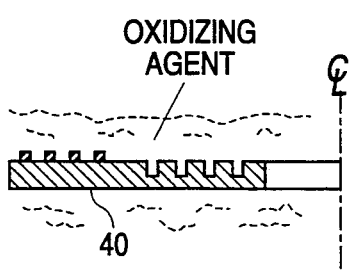
Figure 3E:
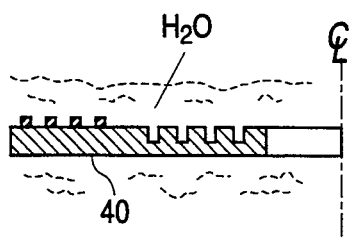
Figure 3F:
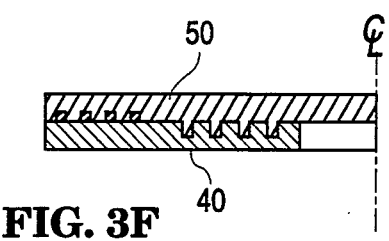
Figure 3G:
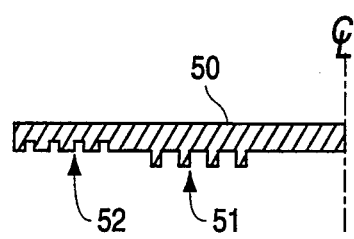
Figure 3H:
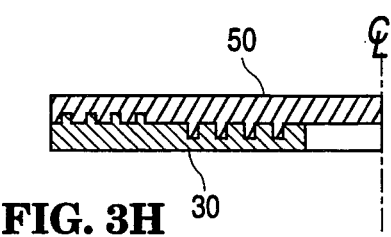
Figure 3I:
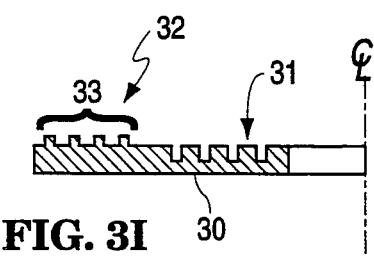
Figure 3J:
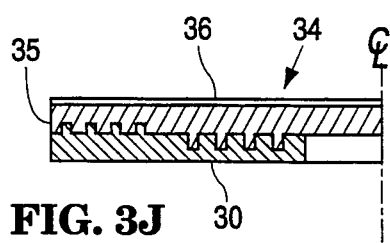

Preferably, as shown in FIG. 2, a CD 30 of the invention may be a 120 mm CD including a central portion 31 recorded in the 80 mm format of a single CD and an unrecorded peripheral portion 32 with the desired indicia 33 formed by a bright metal indicia-bearing surface in the 20 mm radially extending circumferential portion 32 of the CD surrounding the recorded digital data, as more fully described below.

FIG. 3 is a process diagram to illustrate the steps used in the invention. FIG. 3 is a series of cross-sections of one-half of the elements used in the invention to produce CDs, such as those shown in FIG. 2. Like FIG. 1, the elements shown in FIG. 1 and their sizes and shapes are enlarged and out of proportion to help indicate the process steps used in the invention.

In the preferred method of the invention, such CDs are manufactured by recording the digital data in the central 80 mm (see portion 31 of FIG. 2) of a 120 mm master, leaving the remaining circumferential portion (see portion 32 of FIG. 2) of the master with a smooth surface. A father-stamper is formed as described above including an unrecorded peripheral portion. A mother 40 (FIG. 3), to be used in producing production stampers, is then produced by electroforming the mother on the father stamper, as set forth above.

After stripping the nickel mother 40 from the father stamper, as indicated at N of FIG. 3, the steps described above result in the mother 40, including an unrecorded, generally smooth outer peripheral portion 42, 20 mm wide that corresponds to portion 32 of the FIG. 2 disk and a recorded central portion 41 in the central 80 mm of the disk that corresponds to portion 31 of the FIG. 2 disk. Before the preferred indicia is silk-screened onto mother, a temporary protective cover, coating or laminate 46 is applied to the center 80 mm of digital data. This protects the digital data from physical damage while the desired indicia is being applied. This protective coating 46 is removed before cure of silver ink, as described below. As indicated at O of FIG. 3, a silk-screen 43 is provided with openings 44 in the form of the desired indicia, and a silver ink 45 of high purity is applied through the openings 44 by silk-screening to the unrecorded peripheral portion 42 of the mother 40. A preferred silver ink is Flexible Silver Coating No. A-3617 sold by Inglehard Corp., Specialty Chemicals Division, Menlo Park, Conn. 28, Edison, N.J. 00818. A non-preferred but usable silver ink is Inglehard Corp.'s Flexible Silver Coating SC 4004 (No. 16). After the desired indicia, the temporary protective coating 46 is removed.

As indicated at P of FIG. 3, after the silver ink has cured, which with the preferred inks is preferably overnight, the mother 40 has been provided with a print of the desired indicia 44 in its unrecorded outer peripheral portion 42.

After the silver ink has cured on the periphery of the mother disk in the pattern of the desired indicia, the nickel on the mother disk is oxidized with an oxidizing agent, indicated at Q of FIG. 3, and then washed only with water, as indicated at R of FIG. 3. The washed mother 40 is then placed while water-wet in the nickel electroforming bath where a nickel production stamper 50 is formed, as indicated at S of FIG. 3, including a central portion 51 with the recorded digital data and a 20 mm wide peripheral portion 52 adapted to form the desired indicia, as indicated at T of FIG. 3.

Such production stampers 50 are used to provide a mold surface and to form, by injection molding, CD substrate 30 of clear polycarbonate material, as indicated at U of FIG. 3, including a central portion 31 with pits in the pattern of the recorded digital data and an outer peripheral portion 32 with the surface adapted to present the desired indicia 33 in a bright reflective metal when the injection-molded CD is provided with its reflective aluminum coating through sputtering. As indicated at W of FIG. 3, the recorded surface 34 of CD substrate 30 is provided with an aluminum coating 35 and then with a protective lacquer coating 36.

By the process indicated in FIG. 3 and described above, a CD, like that shown in FIG. 2, can be made with digitally recorded music, audio or digital information in the central portion 31 of the disk, and a bright, eye-catching presentation of desired indicia 33 in the large area of the peripheral portion 32 surrounding the recorded digital information. The desired indicia 33 may supplement the information which may be silk-screened onto the lacquer side 34 of the disk and, in some cases, may entirely eliminate the silk-screening operation.

While we have described a preferred embodiment and the best mode currently known to us to practice the invention, other embodiments of the invention will be apparent to those skilled in the art and the invention is to be limited only by the scope of the following claims and the prior art. While the invention was described in the manufacture of audio compact disks, CD-ROM, CD-I and other optical storage devices may also be manufactured with the invention. In addition, although the above description describes the application of the desired indicia to a mother disk by silk-screening, it will be apparent that the desired indicia may be applied to the master or to the father stamper, and, furthermore, that the desired indicia be applied to any of the generations of forms used to produce production stampers by processes other than silk-screening, such as by etching, adhering or otherwise producing the desired indicia on an unrecorded surface portion of a disk. It is a feature of the invention that the desired indicia is molded into the transparent plastic surface of the resulting article.

We claim:

1. In a method of manufacturing a CD, the improvement comprising:
   providing a master having an outer diameter of 120 mm;
   limiting the recordation of digital data to the central 80 mm of the master;
   providing a stamper from said master including a smooth and unrecorded outer peripheral portion and a central portion for forming recorded digital data on the CD;
   producing a mother from said stamper including a smooth and unrecorded peripheral portion and a central portion formed with such recorded digital data;
   placing a desired indicia on the smooth and unrecorded peripheral portion of the mother; and
   producing production tooling from the resulting mother.

2. The improved method of claim 1 wherein the desired indicia is applied to the smooth and unrecorded peripheral portion of the mother by silk-screening.

3. The improved method of claim 2 wherein the desired indicia is formed on the smooth and unrecorded peripheral portion of the disk by silver ink.

4. The improved method of claim 3 wherein the mother is washed only in water following silk-screening of the desired indicia onto the smooth and unrecorded peripheral portion of the disk.

5. The improved method of claim 4 wherein the mother is placed wet into an electroforming bath to be plated with nickel to manufacture a production stamper prior to drying.

6. In a method of manufacturing a CD, the improvement comprising the steps of limiting recordation of digital data to a central portion of a disk to provide a recorded disk with a smooth and unrecorded peripheral portion, placing desired indicia on the unrecorded peripheral portion of the recorded disk, and thereafter producing a production tooling for the manufacturing of a CD from the disk which is adapted to display the desired indicia.

7. The improvement of claim 6 further comprising the steps of:
   providing a stamper from said recorded disk including an unrecorded outer peripheral portion and a central portion for forming recorded digital data on the CD;
   producing a mother from said stamper including an unrecorded peripheral portion and a central portion formed with such recorded digital data;
   placing the desired indicia on the unrecorded peripheral portion of the mother; and
   producing a production tooling from the resulting mother.

8. The improved method of claim 7 wherein the desired indicia is applied to the smooth and unrecorded peripheral portion of the mother after a protective cover is applied over the central portion.

9. The improved method of claim 7 wherein the desired indicia is formed on the smooth and unrecorded peripheral portion of the disk by silk-screening with silver ink.

10. The improved method of claim 9 wherein the mother is washed only in water following silk-screening of the desired indicia onto the smooth and unrecorded peripheral portion of the disk.

11. The improved method of claim 9 wherein the mother is placed wet into an electroforming bath to be plated with nickel to manufacture a production stamper prior to drying.

* * * * *

UNITED STATES PATENT AND TRADEMARK OFFICE
CERTIFICATE OF CORRECTION

PATENT NO. : 5,346,654

DATED : September 13, 1994

INVENTOR(S) : Ichiro Kodaka, et al.

It is certified that error appears in the above-identified patent and that said Letters Patent is hereby corrected as shown below:

In Col. 3, line 32, delete "Fig. 1 is a" and insert --Figs. 1A-1M are--.

In Col. 3, line 32, delete "diagram" and insert --diagrams--.

In Col. 3, line 34, delete "Fig. 1 is" and insert --Figs. 1A-1M are--.

In Col. 3, line 34, before "intended", delete "is" and insert --are--.

In Col. 3, line 35, delete "Fig. 1 shows" and insert --Figs. 1A-1M show--.

In Col. 3, line 41, delete "A of" and after "1", insert --A--.

In Col. 3, line 44, delete "B of", and after "1", add --B--.

In Col. 3, line 53, delete "C of".

In Col. 3, line 54, after "1", add --C--.

In Col. 3, line 57, delete "D of", and after "1", insert --D--.

In Col. 3, line 61, delete "E of", and after "1", add --E--.

In Col. 3, line 66, delete "F of", and after "1" add --F--.

In Col. 4, line 5, delete "G-K of",

UNITED STATES PATENT AND TRADEMARK OFFICE
CERTIFICATE OF CORRECTION

PATENT NO. : 5,346,654

DATED : September 13, 1994

INVENTOR(S) : Ichiro Kodaka, et al.

It is certified that error appears in the above-identified patent and that said Letters Patent is hereby corrected as shown below:

In Col. 4, line 5, delete "Fig. 1", and insert --Figs. 1G-1K--.

In Col. 4, line 10, delete "H of".

In Col. 4, line 11, delete "11" and insert --1H--.

In Col. 4, line 15, delete "I of" and after "1" insert --I--.

In Col. 4, line 22, delete "J of" and after "1" insert --J--.

In Col. 4, line 27, delete "L of" and after "1" insert --L--.

In Col. 4, line 33, delete "M of" and after "1", insert --M--.

In Col. 5, line 4, delete "Fig. 3 is a" and insert --Figs. 3A-3J are--

In Col. 5, line 4, delete "diagram" and insert --diagrams--.

In Col. 5, line 5, delete "Fig. 3 is a" and insert --Figs. 3A-3J are--.

In Col. 5, line 7, delete "Fig. 1" and insert --Figs. 1A-1M--.

UNITED STATES PATENT AND TRADEMARK OFFICE
CERTIFICATE OF CORRECTION

PATENT NO. : 5,346,654

DATED : September 13, 1994

INVENTOR(S) : Ichiro Kodaka, et al.

It is certified that error appears in the above-identified patent and that said Letters Patent is hereby corrected as shown below:

In Col. 5, line 8, delete "Fig. 1" and insert --Figs. 3A-3J--.

In Col. 5, line 18, delete "(Fig. 3)" and insert --(Figs. 3A-3J)--.

In Col. 5, line 22, delete "N of".

In Col. 5, line 22, after "3", insert --A--.

In Col. 5, line 34, delete "O of".

In Col. 5, line 34, after "3", insert --B--.

In Col. 5, line 41, delete "Conn." and insert --CN--.

In Col. 5, line 46, delete "P of" and after "3", insert --C--.

In Col. 5, line 54, delete "Q of" and after "3" insert --D--.

In Col. 5, line 55, delete "R of" and after "3" insert --E--.

In Col. 5, line 58, delete "S of" and after "3" insert --F--.

In Col. 5, line 61, delete "T of" and after "3" insert --G--.

In Col. 5, line 65, delete "U of", and after "3" insert --H--.

UNITED STATES PATENT AND TRADEMARK OFFICE
CERTIFICATE OF CORRECTION

PATENT NO. : 5,346,654

DATED : September 13, 1994

INVENTOR(S) : Ichiro Kodaka, et al.

It is certified that error appears in the above-identified patent and that said Letters Patent is hereby corrected as shown below:

In Col. 6, line 3, delete "W of" and after "3", insert --J--.

In Col. 6, line 6, delete "Fig. 3" and insert --Figs. 3A-3J--.

Signed and Sealed this

Eighth Day of October, 1996

Attest:

BRUCE LEHMAN

Attesting Officer     Commissioner of Patents and Trademarks